Oct. 6, 1931.  E. MURASE  1,826,565
BICYCLE GEARING
Filed May 3, 1930  2 Sheets-Sheet 1
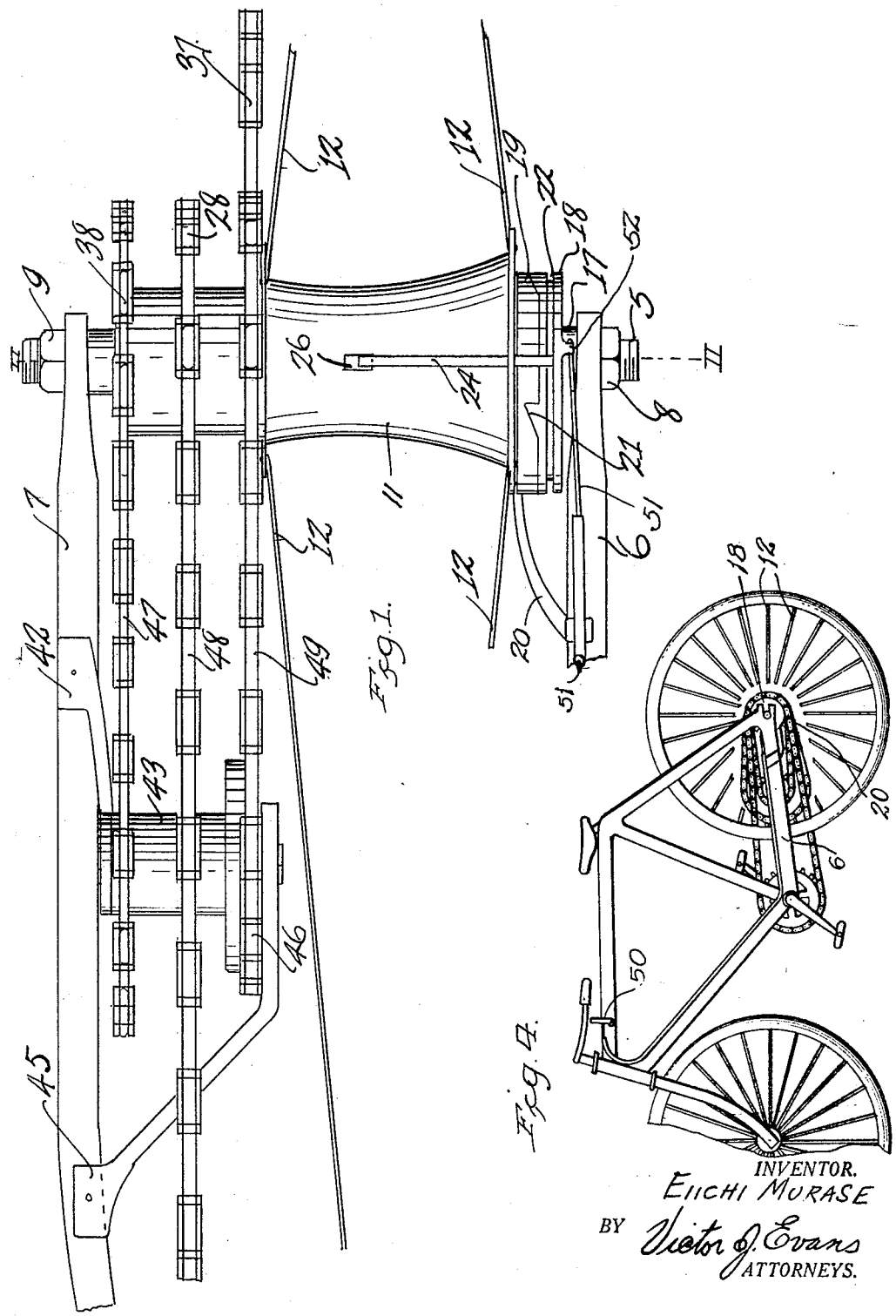
INVENTOR.
EIICHI MURASE
BY Victor J. Evans
ATTORNEYS.

Oct. 6, 1931.  E. MURASE  1,826,565
BICYCLE GEARING
Filed May 3, 1930   2 Sheets-Sheet 2
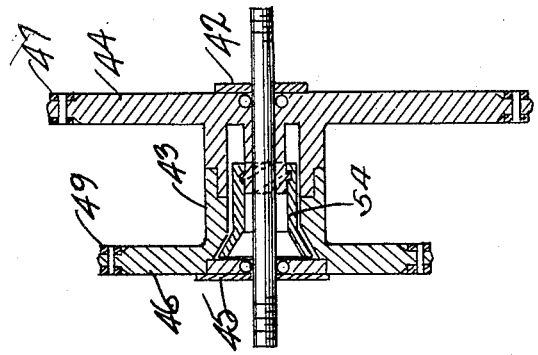
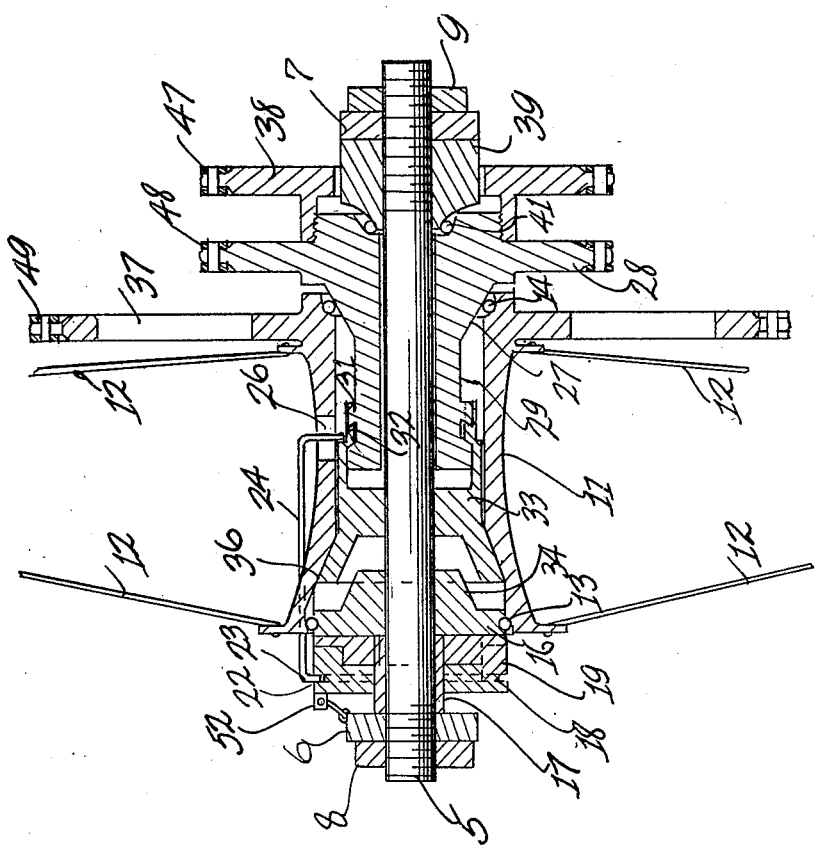
INVENTOR.
EIICHI MURASE
BY Victor J. Evans
ATTORNEYS.

Patented Oct. 6, 1931

1,826,565

UNITED STATES PATENT OFFICE

EIICHI MURASE, OF SAN FRANCISCO, CALIFORNIA

BICYCLE GEARING

Application filed May 3, 1930. Serial No. 449,589.

This invention relates to improvements in bicycle gearing and has particular reference to means for changing the speed ratio of the driving of the bicycle.

The principal object of this invention is to produce a gear shifting arrangement which may be incorporated in the usual coaster brake hub of a bicycle whereby the user of the bicycle may pedal in the ordinary manner and with the regulation gearing, but when a grade is encountered the user of the bicycle may throw a lever so as to bring into play a reduction gearing thus making it easier to ride over the grade.

Other objects and advantages will be apparent during the course of the following description.

In the accompanying drawings forming a part of this specification and in which like numerals are employed to designate like parts throughout the same, Figure I is a top plan view of my gearing arrangement as the same would apply to a bicycle, a portion of which is shown broken away, Figure II is a cross sectional view taken on the line 2—2 of Figure I, and Figure III is a cross sectional view of the auxiliary hub.

The ordinary bicycle has incorporated in the rear hub what is commonly termed a coaster brake, the arrangement being such that when the operator is pedaling in forward direction, motion is transmitted to the hub for the purpose of rotating the same and when the operator stops pedaling the hub is free to rotate. When the operator pushes backwardly upon the pedals a braking action is accomplished thus stopping the rotation of the hub and wheel attached thereto. Applicant has retained all of these features and has added thereto an arrangement whereby the speed ratio between the pedal sprocket and the hub may be changed.

In the accompanying drawings wherein for the purpose of illustration is shown a preferred embodiment of my invention, the numeral 5 designates the customary axle which is held between the arms 6 and 7 of the frame and secured thereto through the medium of nuts 8 and 9. A hub shell is shown at 11 which is the ordinary coaster brake shell and has the wheel rim secured thereto through the medium of the ordinary spokes 12. This shell is supported upon roller bearings 13 and 14, the roller bearing 13 being interposed between the shell and a cone 16 which cone abuts a spacer 17 upon which is freely mounted a pair of discs 18 and 19. The member 19 is held against rotation by its engagement with the cone 16. This cone is held by the usual coaster brake arm 20, which arm connects to the frame 6, it being understood that the cone 16 and the member 19 are held against rotation with respect to each other, in any convenient manner such as by providing the usual serrated surfaces commonly found in coaster brake constructure. One of these discs has cam shaped projections 21 which fit into correspondingly shaped recesses formed in the other of said discs. The disc 18 also has an annular slot 22 which is engaged by the down-turned nose 23 of a slide rod 24, the end of which projects through a slot 26 formed in the shell 11. The bearing 14 engages a cone surface 27 formed upon the main driving sprocket 28. This driving sprocket has an extension 29 which lies within the shell 11 and carries a thread 31 which is engaged by an internal thread 32 formed upon the coupling member 33 which coupling member is free to slide and rotate upon the axle 5 the abutting surfaces of the cone 16 and disc 19 are serrated so as to prevent relative movement therebetween. This coupling member is of the ordinary construction found in all coaster brakes and is adapted to move against the brake surface 34 when braking is desired or to move against the driving surface 36 as shown in the drawings when forward high gear movement is desired. A sprocket 37 is secured to the shell 11 and hereafter will be known as the low ratio sprocket. The sprocket 28 will be known as the main drive sprocket and a sprocket 38 will be hereafter known as the transfer sprocket. The sprocket 38 is secured to the sprocket 28 in any convenient manner. A second cone 39 is interposed between the driving sprocket and the arm 7.

The roller bearings 41 serve to reduce the friction between these points.

Mounted upon the frame member 7 are brackets 42 and 45 between which is positioned a shaft carrying a split hub 43 having a sprocket 44 secured to one part and a sprocket 46 secured to the other part. Within this hub is a similar coupling member to that shown at 33 the action of which is so well known that further comment is unnecessary. A chain 47 passes from the sprocket 44 to the transfer sprocket 38. The main drive chain 48 passes from the pedal sprocket over the main drive sprocket 28 and a chain 49 passes from the sprocket 46 to the low ratio sprocket 37.

The result of this construction is that when my device is installed upon a bicycle the rider pedals in the usual manner with the result that the chain 48 transmits motion to the main drive sprocket 28, the rotation of which through the threaded connection 31 and 32 draws the coupling member 33 against the shell 11 at the point 36 and consequently rotation of the wheel will result. The other chains merely run idle.

When the operator encounters a grade and wishes to change to the low gear ratio, he first stops pedalling with the result that the coupling member will move toward the left of the drawing a sufficient distance to brake the driving connection with the shell. It might be said that the device is in coasting arrangement. By now pulling upon a lever conveniently located upon the frame of the bicycle, which lever is connected to the wire 51 and which is connected to the lug 52 carried upon the member 18, results in moving the members 18 and 19 with relation to each other, thus separating them and giving a sliding movement to the slide rod 24. The slide rod will now be in such a position that it will not permit the coupling member to move toward the right when the operator again starts to pedal and as a consequence the pedalling action will move the chain 48 which will rotate the main driving sprocket 28 and transfer sprocket 38 attached thereto. This rotation of the transfer sprocket will cause the chain 47 to rotate the sprocket 44 upon the interior of the hub of which is a thread which engages a coupling member 54. The direction of the thread is such that this coupling member will be drawn toward the sprocket 44 and thus lock the two halves of the sleeve 43 so that they will rotate in unison and as a consequence, the sprocket 48 will now transmit motion thru the chain 49 to the low speed sprocket 37. By drawing the lever so that the members 18 and 19 moving each other again, the high gear ratio may easily be restored and during the high gear connection the differential action between the chains 47 and 49 takes place due to the coupling members within the split hub 43, breaking its hold.

It will thus be seen that I have produced a device which will accomplish all the objects above set forth.

It is to be understood that the form of my invention herewith shown and described is to be taken as a preferred example of the same and that various changes relative to the material, size, shape, and arrangement of parts may be resorted to without departing from the spirit of the invention or the scope of the subjoined claims.

Having thus described my invention, I claim:—

1. In combination with a bicycle hub, of a low ratio sprocket attached thereto, a main drive sprocket freely rotatable with relation to said hub, means for locking said main drive sprocket to said hub and means for holding said main drive sprocket unlocked with respect to said hub for the purpose specified.

2. In combination with a bicycle hub having a low ratio sprocket attached thereto, of a main drive sprocket, a coupling member movable in said hub and being adapted to lock said main drive sprocket to said hub, and means for holding said coupling member whereby said coupling member may be held out of locking arrangement for a predetermined interval.

3. In combination with a bicycle hub having a low ratio sprocket attached thereto, of a main drive sprocket, a coupling member movable in said hub and being adapted to lock said main drive sprocket to said hub, means for holding said coupling member whereby said coupling member may be held out of locking arrangement when desired, said means including a pair of discs cam actuated, means for moving said discs apart, and a slide rod actuated by said discs for holding said coupling member out of engagement with said hub.

In testimony whereof I affix my signature.

EIICHI MURASE.